United States Patent
Wegener et al.

(10) Patent No.: US 9,962,062 B2
(45) Date of Patent: May 8, 2018

(54) SUPPLY CONTAINER FOR A DISPENSING DEVICE

(71) Applicant: Miele & Cie. KG, Guetersloh (DE)

(72) Inventors: Dirk Wegener, Bielefeld (DE); Fabian Hils, Delbrueck (DE); Guenter Kroeger, Rahden (DE); Holger Ernst, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 0 days. days.

(21) Appl. No.: 15/361,026

(22) Filed: Nov. 24, 2016

(65) Prior Publication Data

US 2017/0143185 A1 May 25, 2017

(30) Foreign Application Priority Data

Nov. 25, 2015 (DE) ......................... 10 2015 120 422

(51) Int. Cl.
| | |
|---|---|
| *A47L 15/44* | (2006.01) |
| *B65D 43/02* | (2006.01) |
| *B65D 83/06* | (2006.01) |
| *G01F 11/26* | (2006.01) |

(52) U.S. Cl.
CPC ....... *A47L 15/4409* (2013.01); *A47L 15/4472* (2013.01); *B65D 43/02* (2013.01); *B65D 83/06* (2013.01); *G01F 11/261* (2013.01); *A47L 15/4463* (2013.01)

(58) Field of Classification Search
None
See application file for complete search history.

(56) References Cited

FOREIGN PATENT DOCUMENTS

| | | |
|---|---|---|
| DE | 202004006632 U1 | 9/2004 |
| DE | 102013104391 A1 | 10/2014 |
| WO | WO 2008012613 A2 | 1/2008 |
| WO | WO2013/113576 A1 * | 8/2013 |
| WO | WO 2013113576 A1 | 8/2013 |

* cited by examiner

*Primary Examiner* — Michael Barr
*Assistant Examiner* — Jason Riggleman
(74) *Attorney, Agent, or Firm* — Leydig, Voit & Mayer, Ltd.

(57) ABSTRACT

A supply container for placement in a dispensing device of a program-controlled cleaning appliance, in particular a dishwasher, includes a main body providing a volumetric space, the volumetric space being of a size suitable for storing an amount of powdered detergent sufficient for performing a plurality of wash cycles. The main body includes a bottom portion and a circumferential side wall integrally formed therewith, the side wall being equipped with a flange located opposite the bottom portion and extending radially outwardly from the side wall.

14 Claims, 14 Drawing Sheets

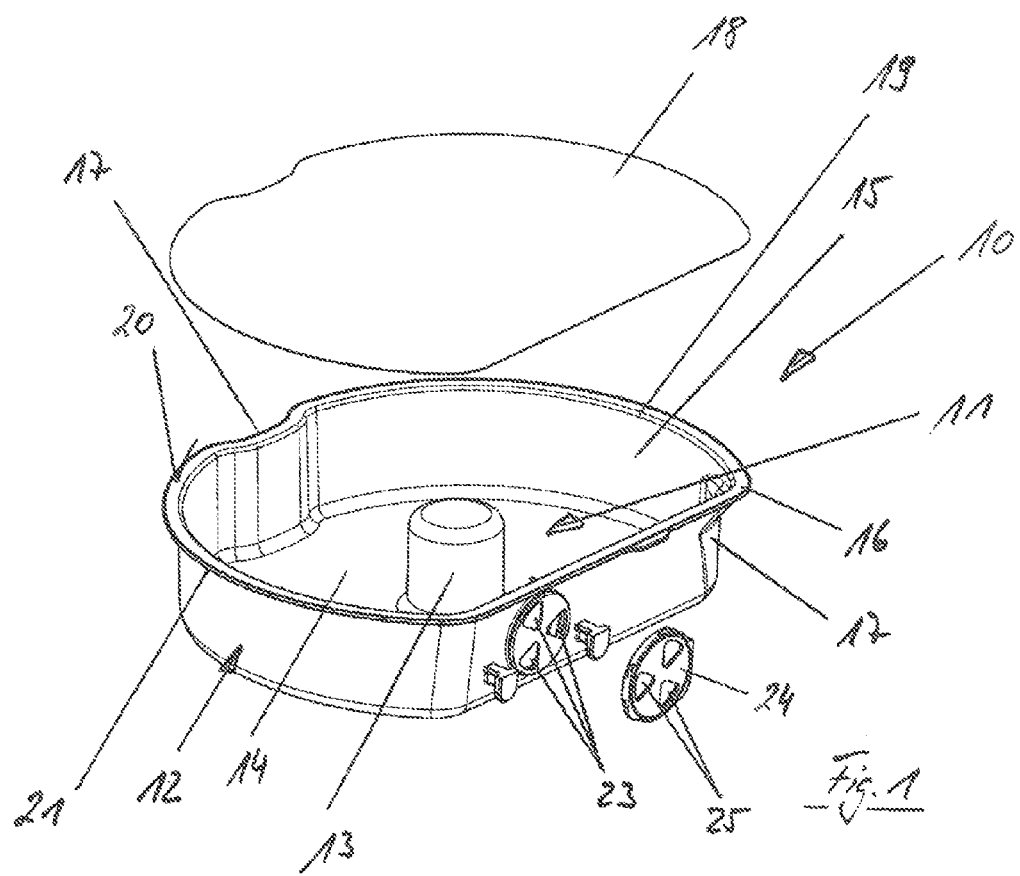
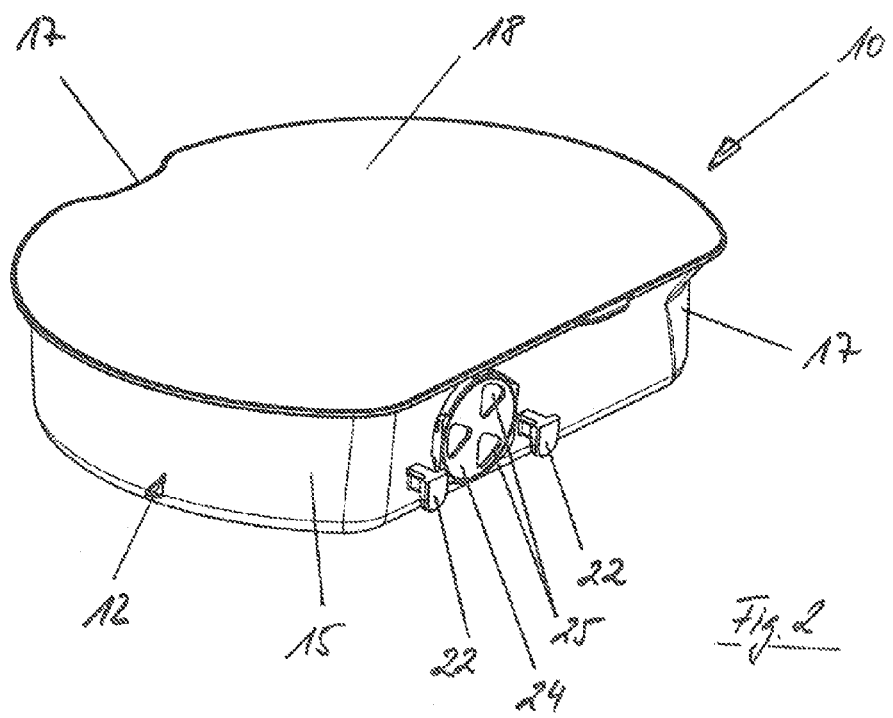

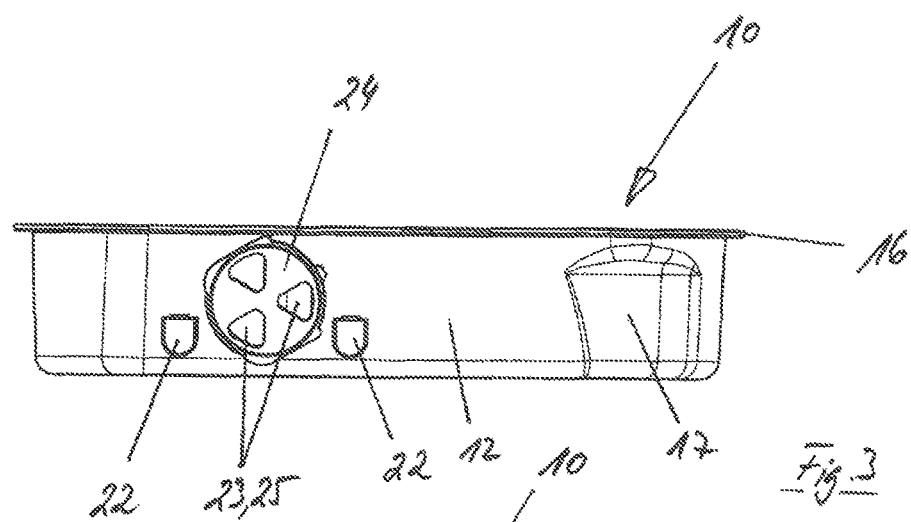
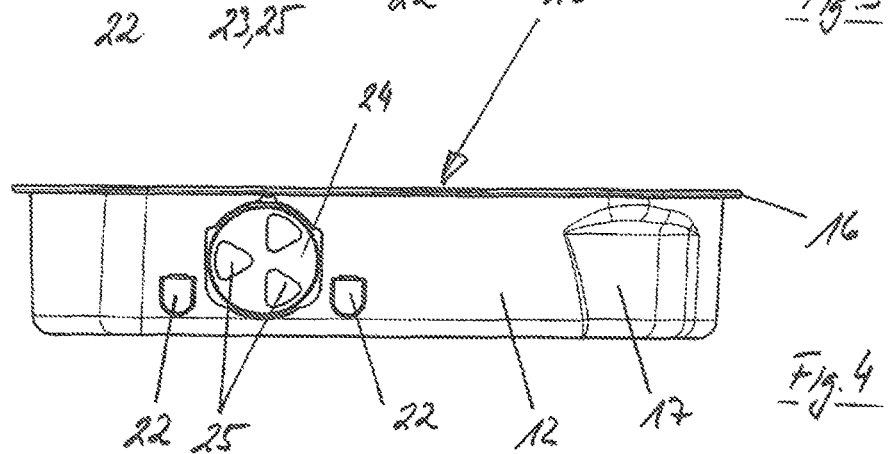
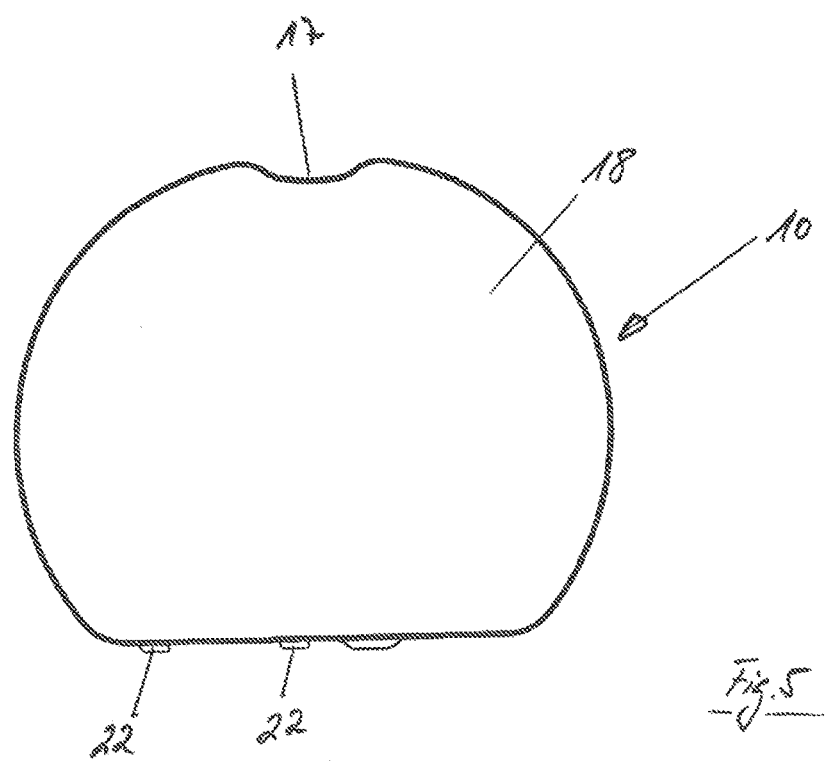

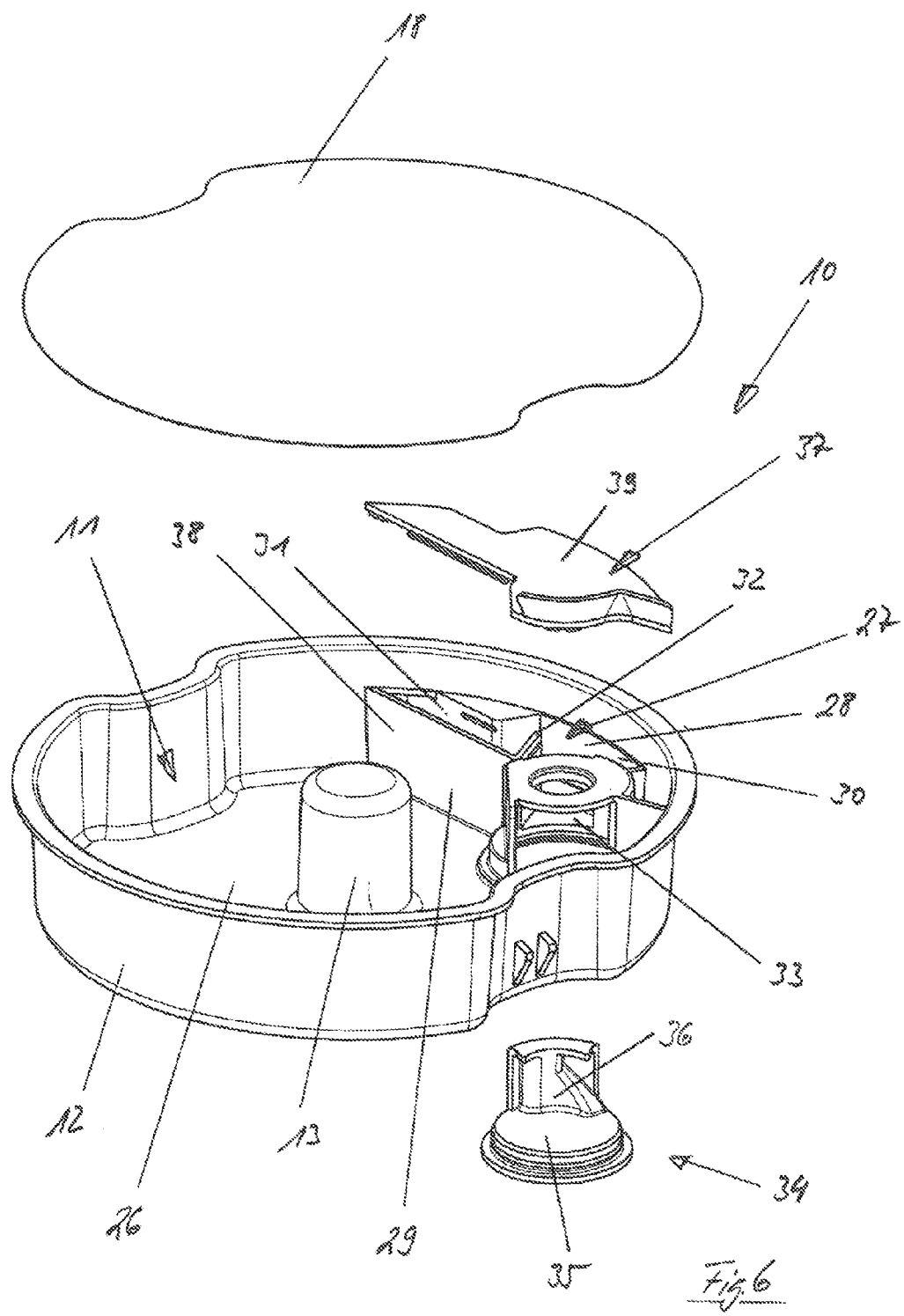

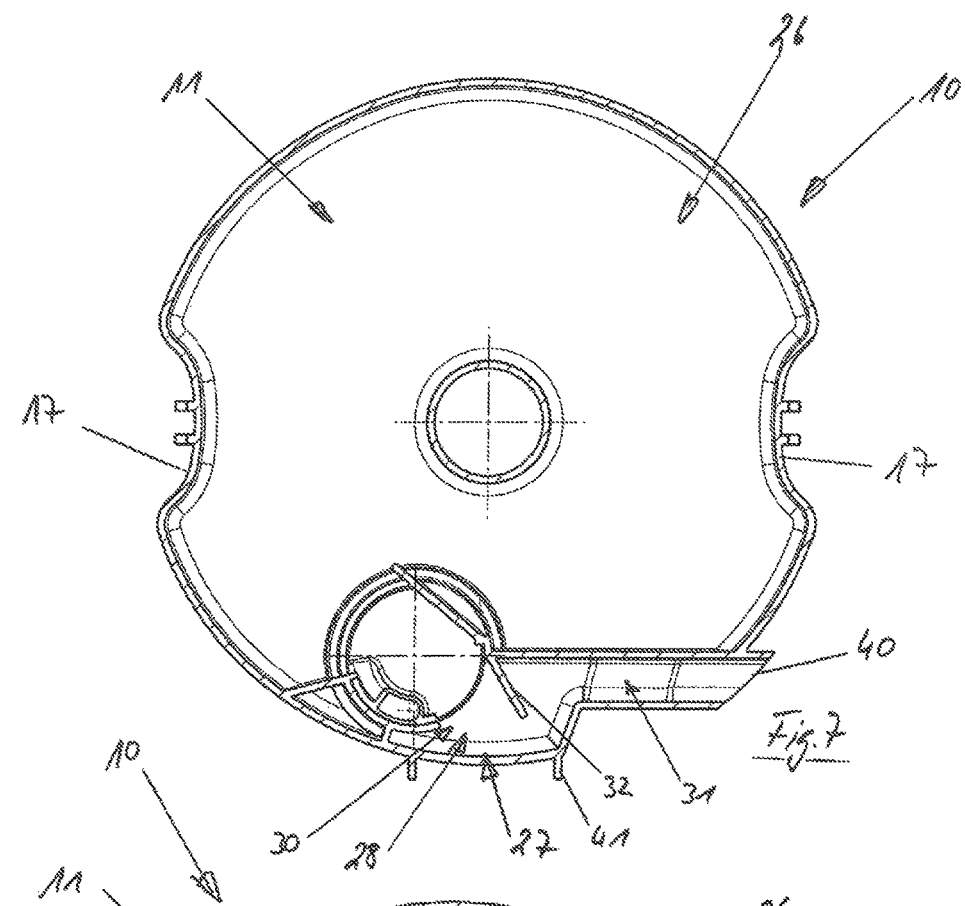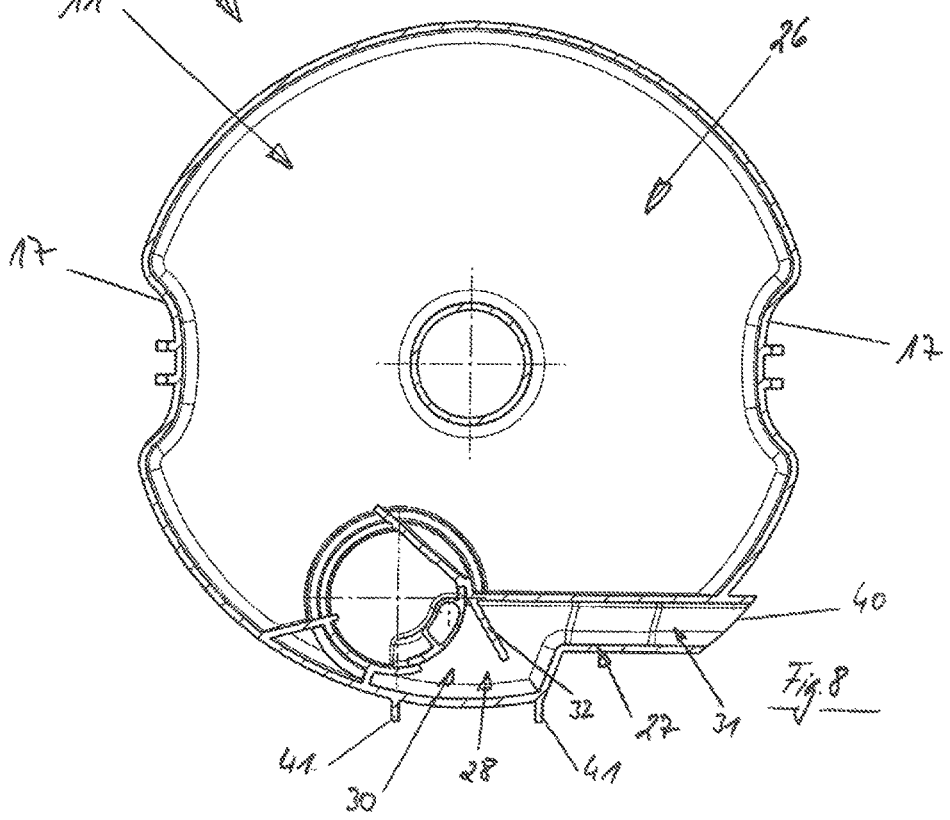

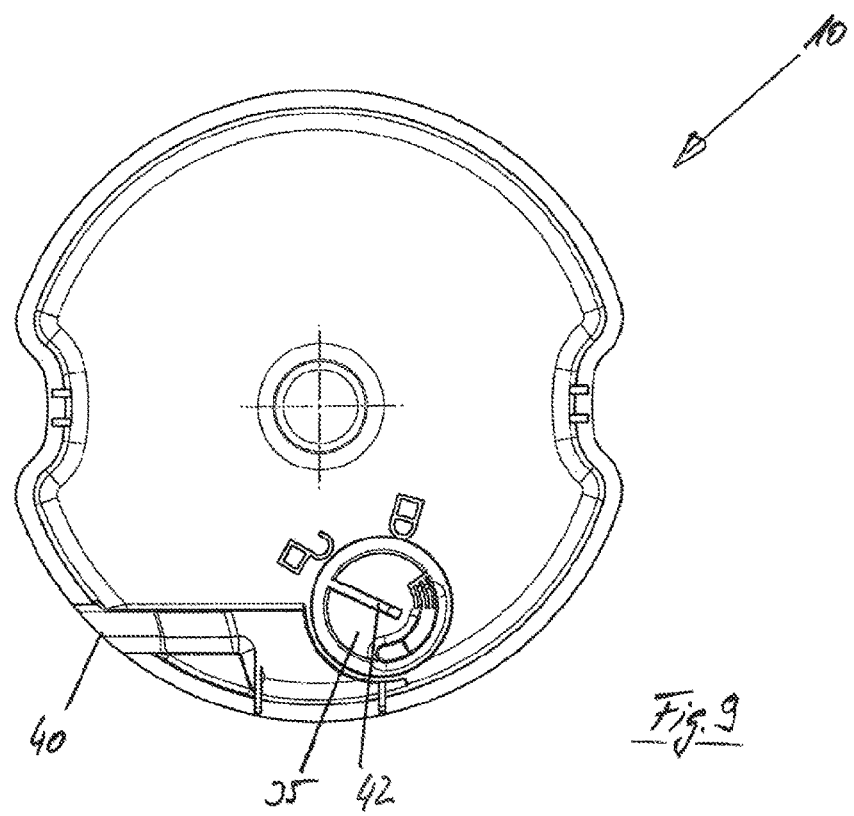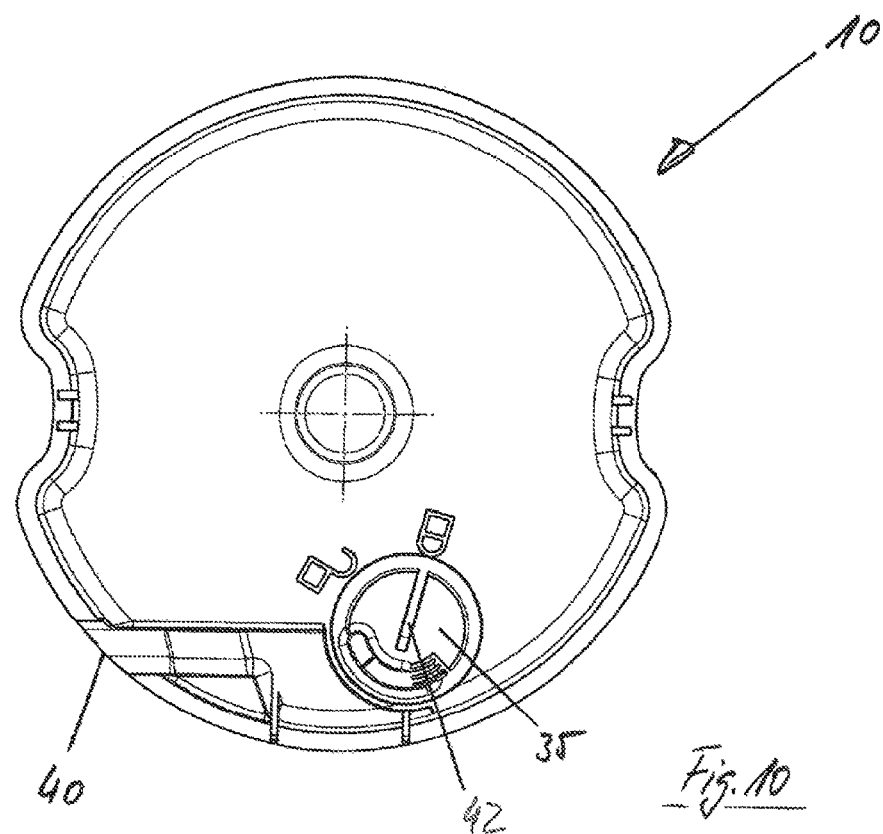

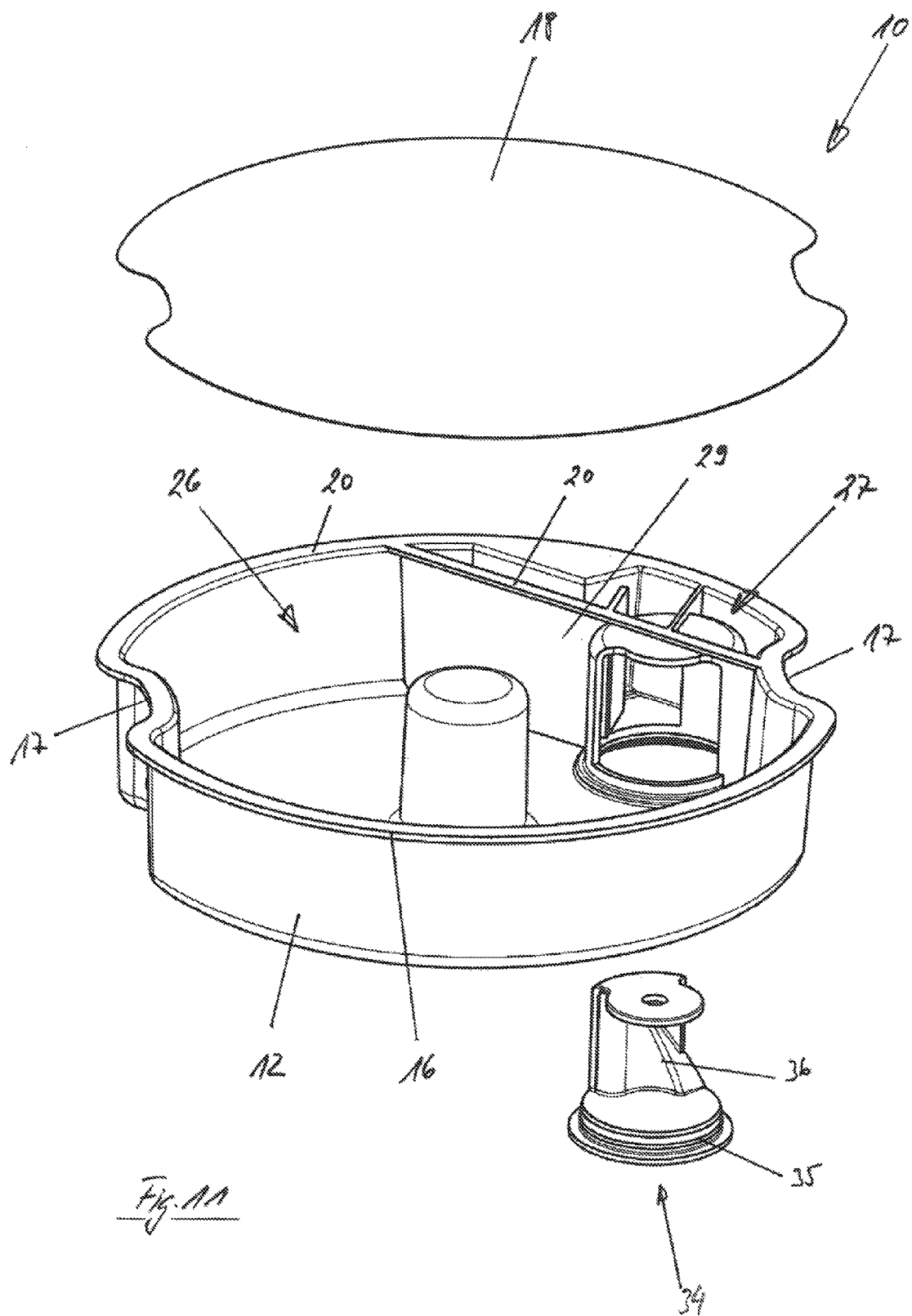

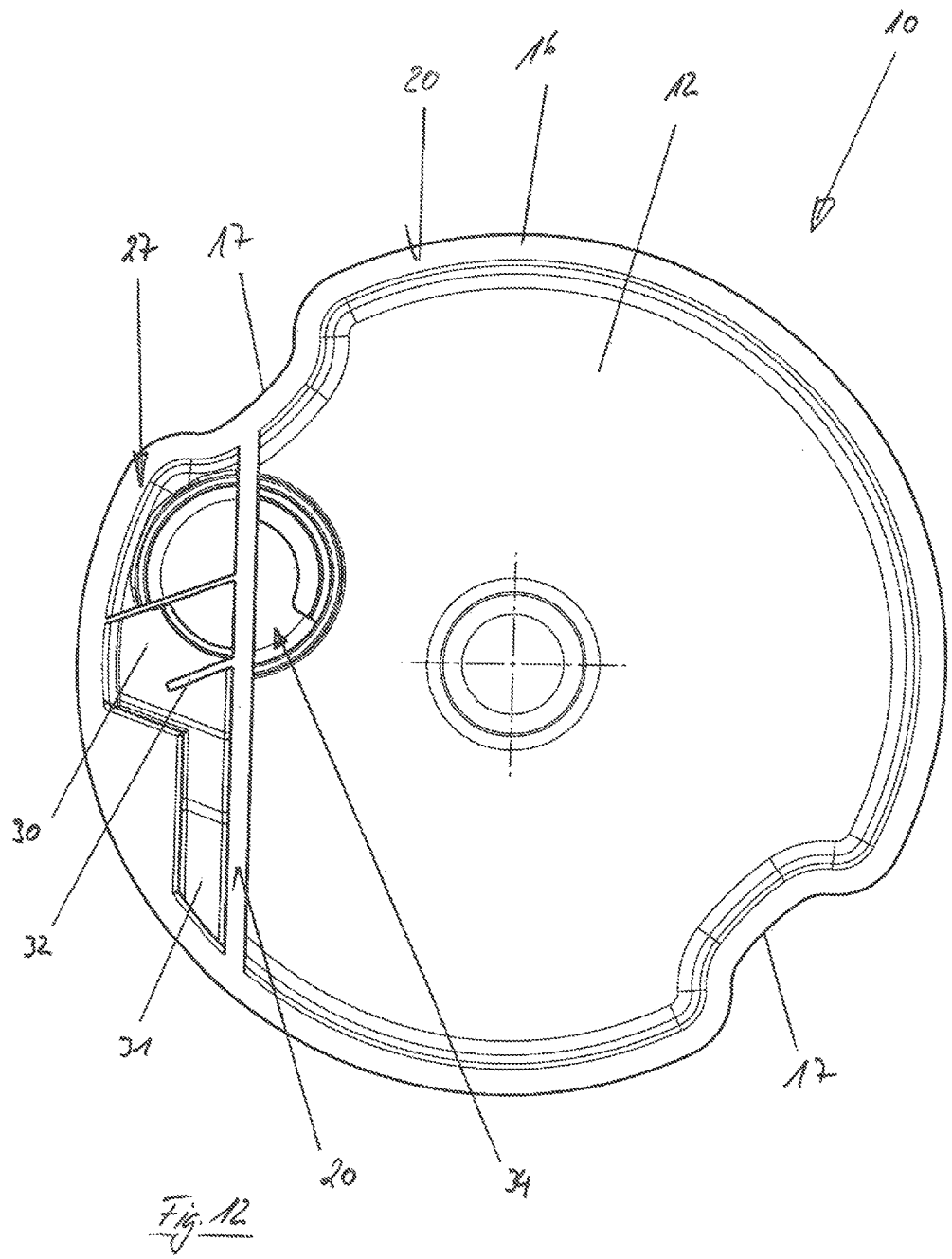

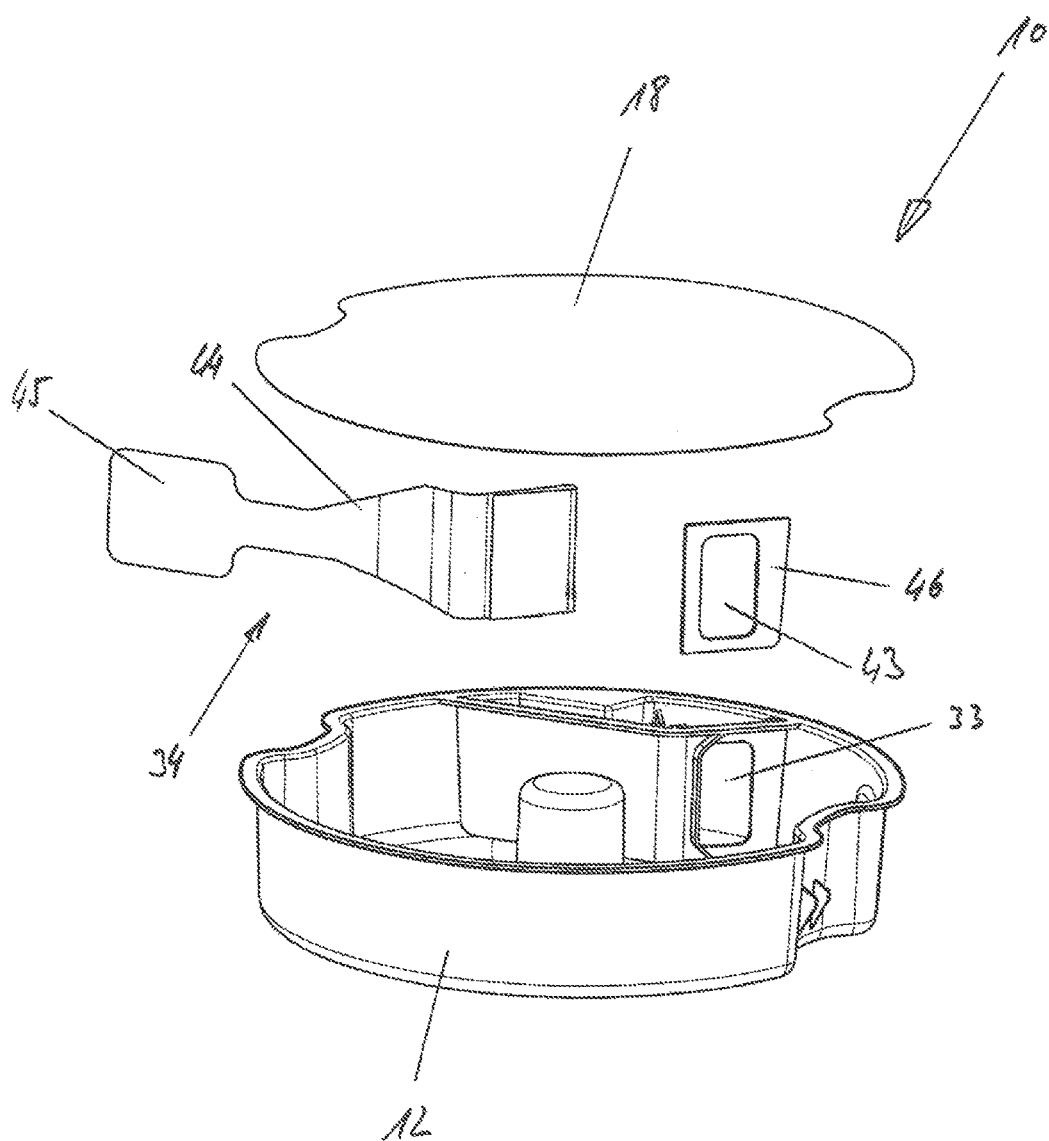

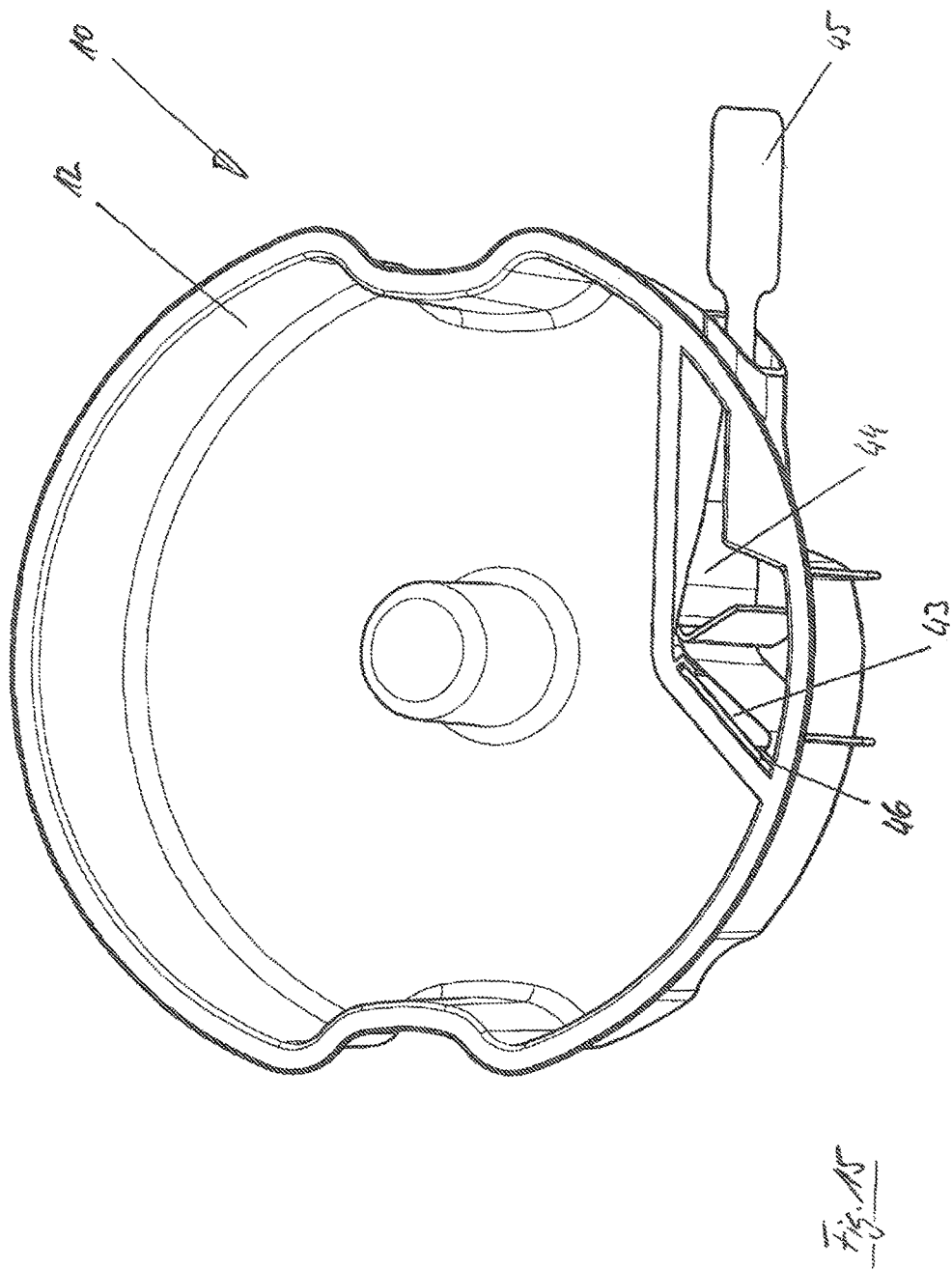

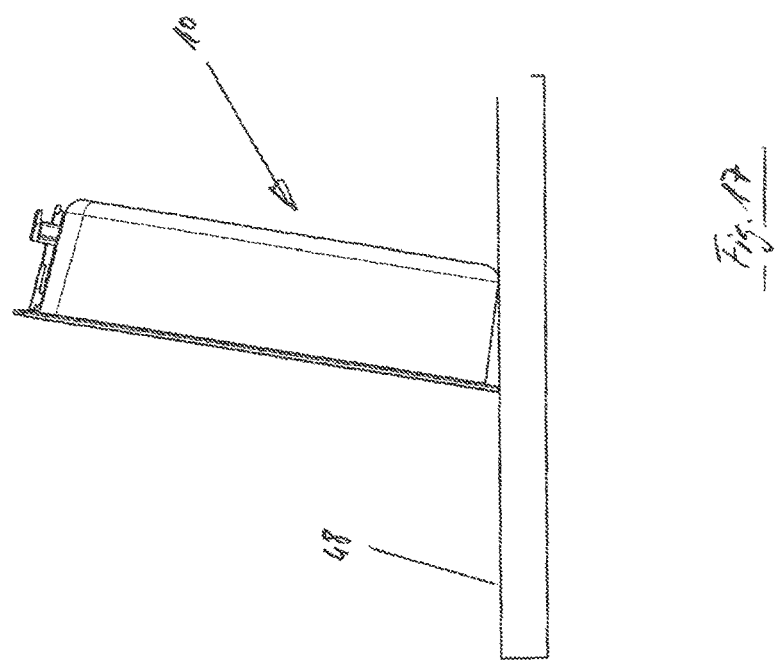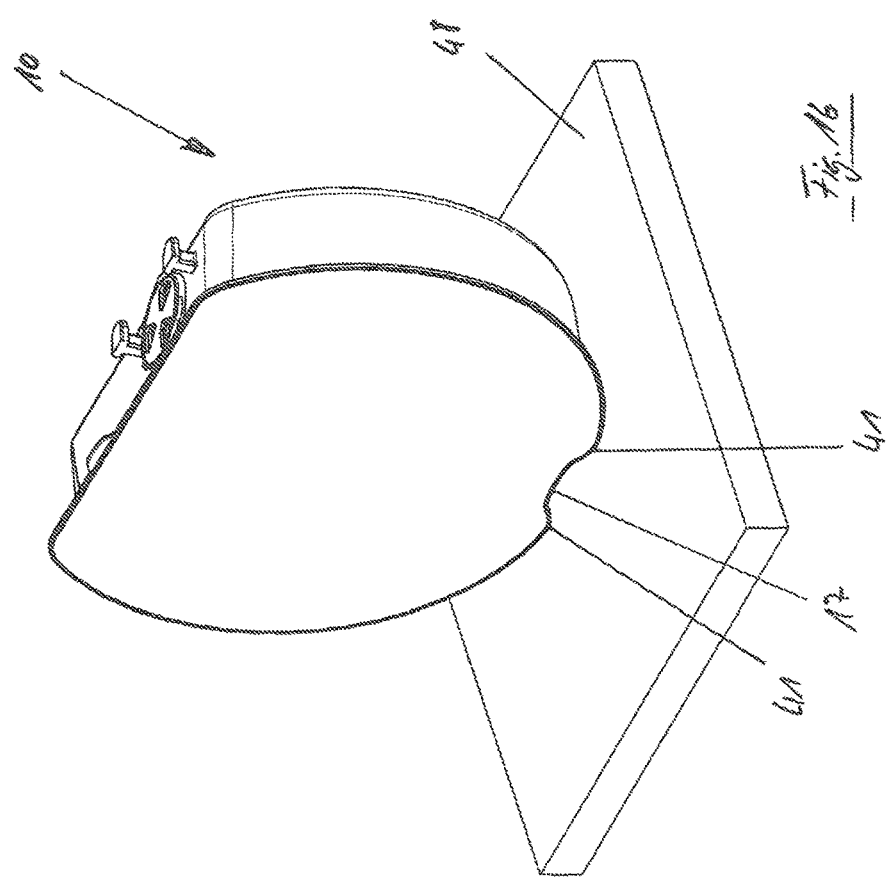

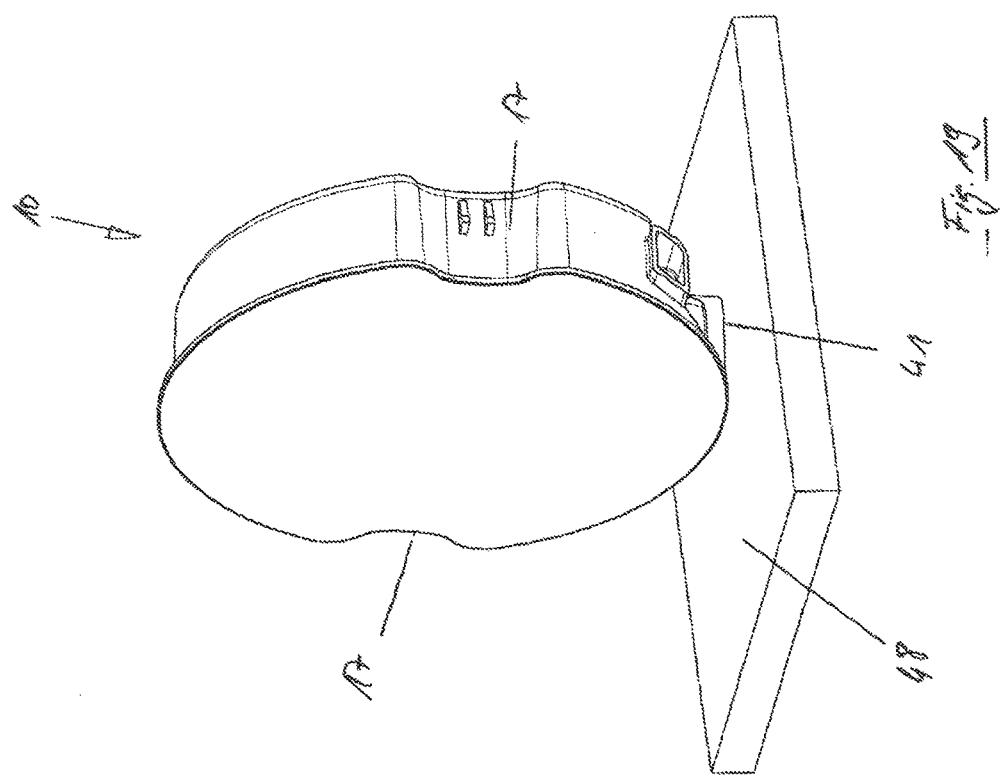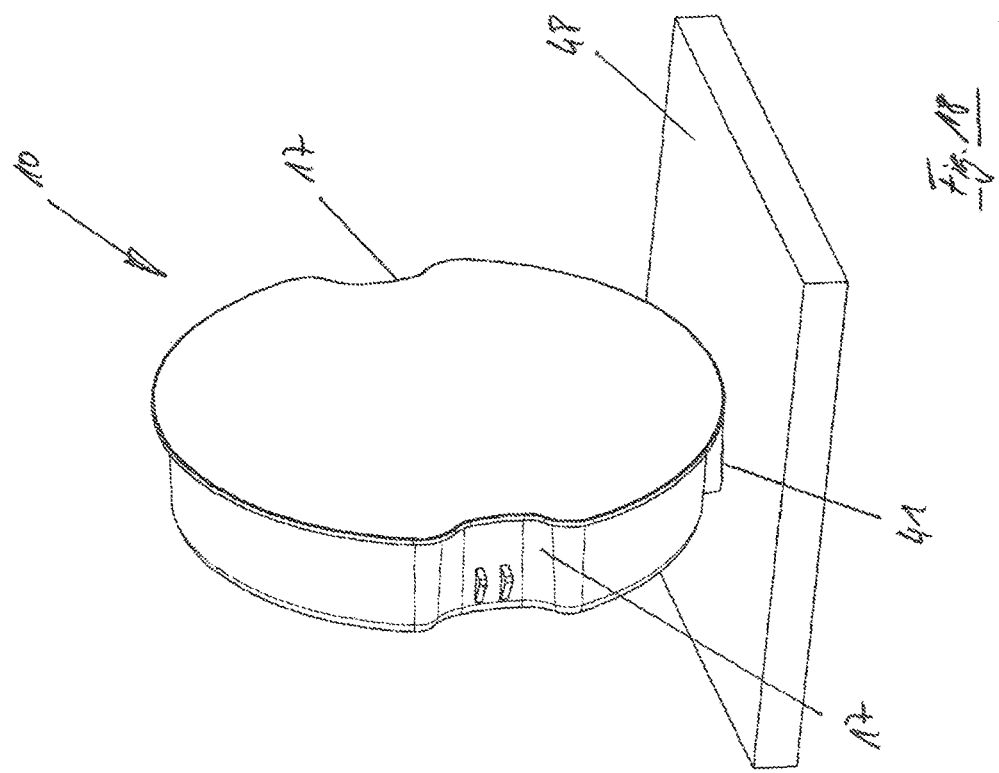

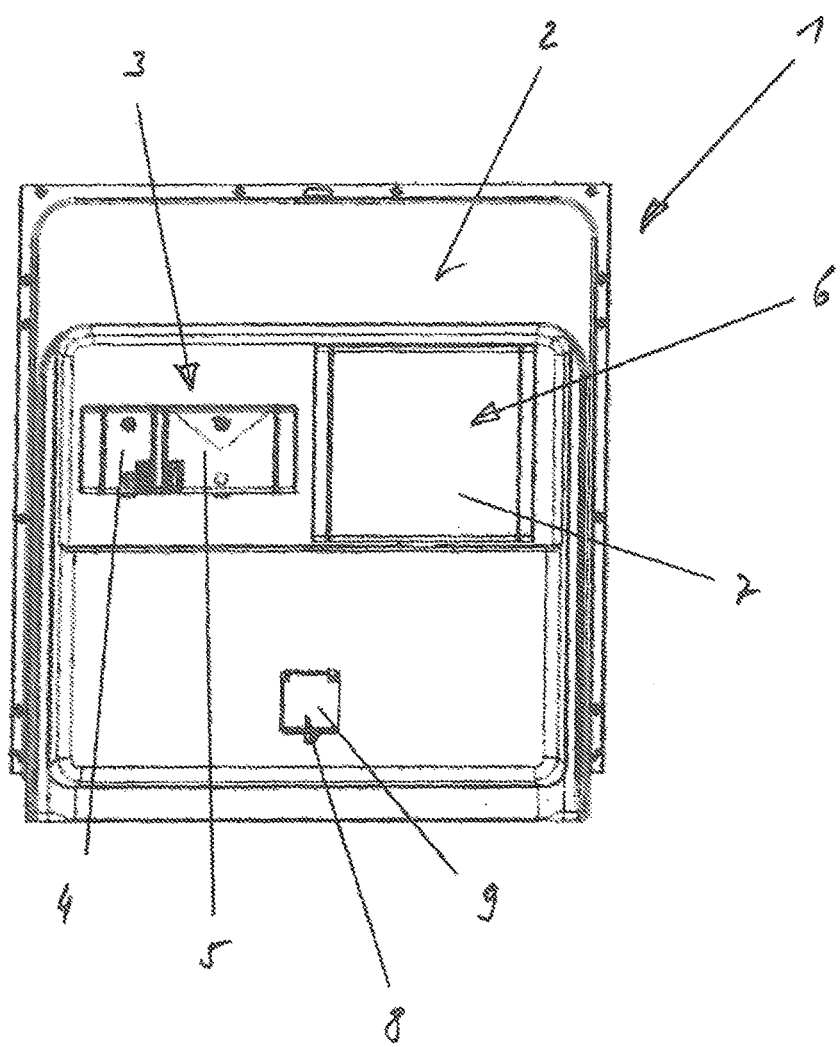

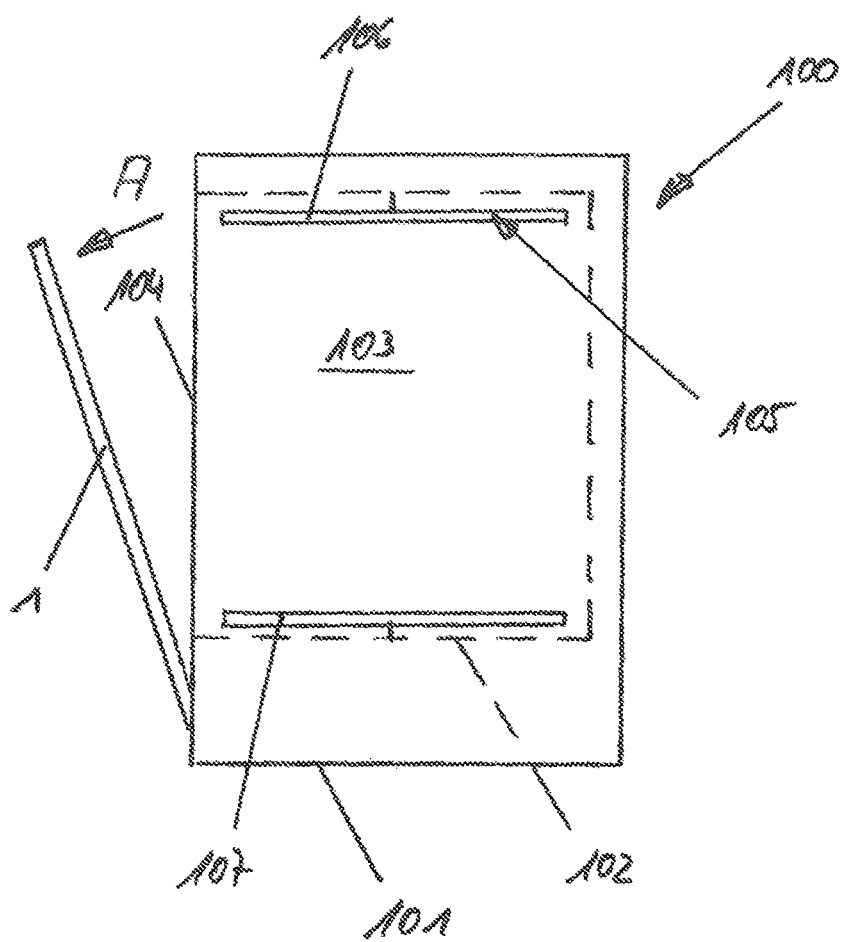

SUPPLY CONTAINER FOR A DISPENSING DEVICE

CROSS-REFERENCE TO PRIOR APPLICATIONS

Priority is claimed to German Patent Application No. DE 10 2015 120 422.3, filed on Nov. 25, 2015, the entire disclosure of which is incorporated by reference herein.

FIELD

The present invention relates to a supply container for placement in a dispensing device of a program-controlled cleaning appliance, in particular a dishwasher, the supply container having a main body providing a volumetric space, the volumetric space being of a size suitable for storing an amount of powdered detergent sufficient for performing a plurality of wash cycles.

BACKGROUND

Program-controlled cleaning appliances in general, and dishwashers in particular, are per se well known in the art and, therefore, need not be specifically described herein.

Cleaning appliances of type in question typically have a washing tub providing a treatment chamber, also called washing chamber. The treatment chamber is accessible to a user via a loading opening which can be closed in a fluid-tight manner by a pivotably mounted washing chamber door. During normal use, the washing tub serves to receive items to be washed which, in the case of a dishwasher, may be dishes, cutlery items and/or the like.

In order to apply wash water, also called wash liquid, to the items to be washed, the cleaning appliance has a spray device disposed inside the washing tub. This spray device generally provides rotatable spray arms, typically two or three such spray arms. During normal use, wash liquid is applied to the items to be washed by rotating spray arms.

In order to achieve optimized cleaning results, process chemicals are used which are delivered into the washing chamber during a cleaning operation. Typically, the process chemicals are added to the wash liquid. Such process chemicals may, for example, be detergents, which are added into the washing chamber of the cleaning appliance in a program-controlled manner at a particular point in time during the operational cycle.

Detergents in liquid and solid form are known in the art. Solid detergents may be in form of pourable powders or so-called tabs; i.e., in tablet form. However, practice has shown that the comparatively best results can be achieved with pourable detergents in powder form.

When pourable detergents in powder form are used, the user must manually measure out the detergent each time before a cleaning cycle is started. For this purpose, a cleaning appliance typically has a supply container which is disposed on the inner side of the door and has to be charged with a manually selected amount of detergent. During operation, this supply container opens at a particular point in time during the wash cycle, allowing the detergent held in the supply container to be washed out by the wash liquid present in the washing chamber of the cleaning appliance.

To be able to store detergent for a plurality of wash cycles, avoiding the need to manually measure out detergent each time before a wash cycle is started, dispensing devices have been proposed, such as, for example, in DE 10 2013 104 391 A1.

This known dispensing device has a replaceable supply container for storing an amount of detergent sufficient for a plurality of wash cycles. The supply container is rotatable about an axis of rotation. During a normal dispensing event, the supply container is rotated in a program-controlled manner. For this purpose, a motor-driven drive device is provided which, when operated, causes rotational movement of the supply container. In the process, the motor-driven drive device cooperates with a carrier unit which replaceably receives the supply container.

To permit release of detergent, the supply container has an outlet opening. During operation, detergent is released in portions through this opening. Such a release of detergent occurs in response to a rotational movement of the supply container. Each 360° rotation of the supply container causes equal portions of detergent to be fed to the outlet opening and released from there into the washing chamber of the cleaning appliance via an interposed channel system.

The supply container used in the known dispensing device has a main body providing a volumetric space. This volumetric space serves to hold powdered detergent and is of a size that allows storage of an amount of detergent sufficient for performing a plurality of wash cycles. Such a supply container; i.e., a supply container of the above-mentioned type, is described in the aforementioned German Patent Application DE 10 2013 104 391 A1.

Although the prior art has described various supply containers that have proven practical in everyday use, there is still a need for improvement, particularly with regard to increased ease of handling. It is, therefore, an object of the present invention to provide a supply container for placement in a dispensing device of a program-controlled cleaning appliance, which supply container provides increased ease of handling because of the design.

SUMMARY

In an embodiment, the present invention provides a supply container for placement in a dispensing device of a program-controlled cleaning appliance, the supply container comprising: a main body providing a volumetric space, the volumetric space being of a size suitable for storing an amount of powdered detergent sufficient for performing a plurality of wash cycles, the main body including a bottom portion and a circumferential side wall integrally formed therewith, the side wall being equipped with a flange located opposite the bottom portion and extending radially outwardly from the side wall.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic exploded view of a supply container according to a first embodiment;

FIG. 2 is a schematic perspective view of the supply container of FIG. 1;

FIG. 3 is a schematic side view showing the supply container of FIG. 1 in the open position;

FIG. 4 is a schematic side view showing the supply container of FIG. 1 in the closed position;

FIG. 5 is a schematic top plan view of the supply container of FIG. 1;

FIG. 6 is a schematic exploded view of a supply container according to a second embodiment;

FIG. 7 is a schematic top sectional view showing the supply container of FIG. 6 in the open position;

FIG. 8 is a schematic top sectional view showing the supply container of FIG. 6 in the closed position;

FIG. 9 is a schematic bottom plan view showing the supply container of FIG. 6 in the open position;

FIG. 10 is a schematic bottom plan view showing the supply container of FIG. 6 in the closed position;

FIG. 11 is a schematic exploded view of a supply container according to a third embodiment;

FIG. 12 is a schematic top plan view of the supply container of FIG. 11;

FIG. 13 is a schematic exploded view of a supply container according to a fourth embodiment;

FIG. 15 is a schematic perspective view of the supply container of FIG. 13;

FIG. 16 is a schematic perspective view showing the supply container of FIG. 1 in a display position;

FIG. 17 is a schematic side view showing the supply container of FIG. 1 in a display position;

FIG. 18 is a schematic perspective view showing the supply container of FIG. 6 in a display position;

FIG. 19 is another schematic perspective view showing the supply container of FIG. 6 in a display position;

FIG. 20 is a schematic view of the inner side of a washing chamber door of a dishwasher; and FIG. 21 is a schematic side view of a cleaning appliance in the form of a dishwasher.

DETAILED DESCRIPTION

Figure 14:
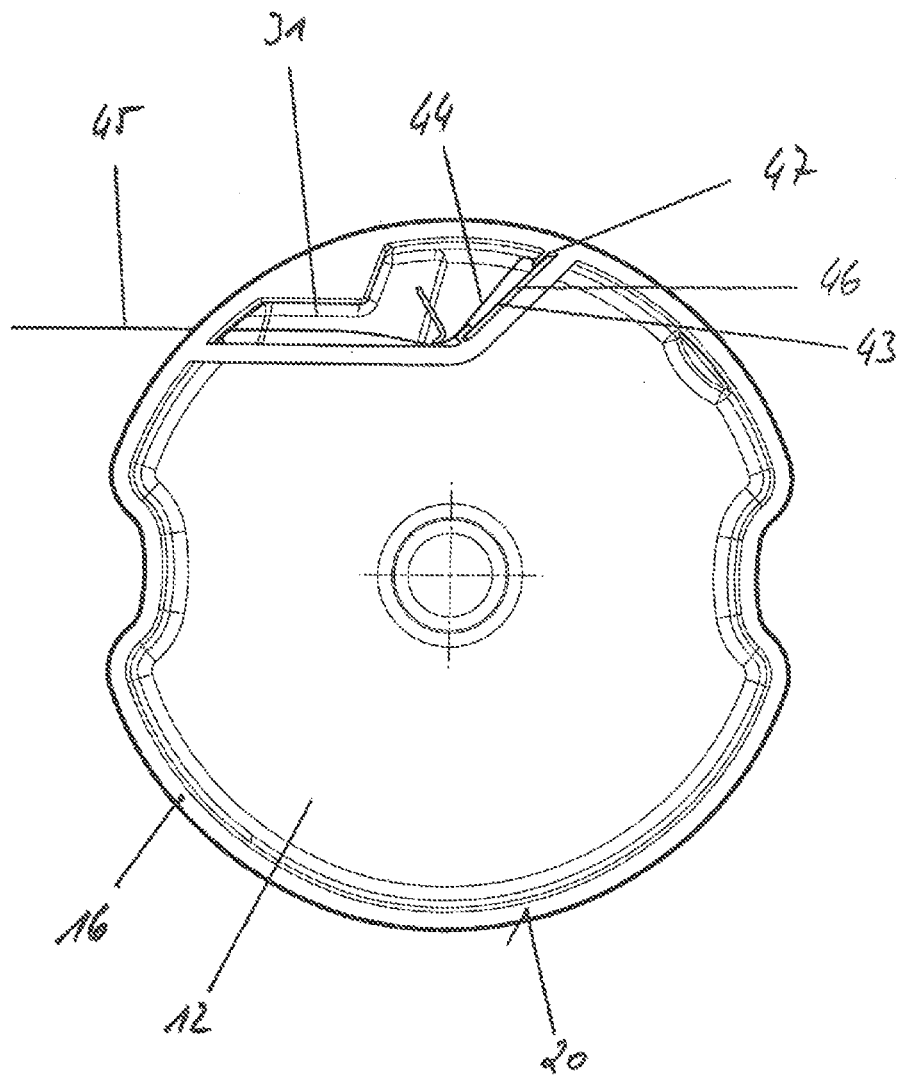
FIG. 14 is a schematic top plan view of the supply container of FIG. 13.

In an embodiment, the present invention provides a supply container of the aforementioned type which is characterized in that the main body includes a bottom portion and a circumferential side wall integrally formed therewith, the side wall being equipped with a flange located opposite the bottom portion and extending radially outwardly.

The supply container of the present invention has a main body configured in a cup-like shape, a bottom portion and a circumferential side wall integrally formed therewith. Thus, the main body is open on one side and has a loading aperture located opposite the bottom portion. Due to its size, this loading aperture allows the volumetric space provided by the main body to be filled with powdered detergent in a time-optimized manner at the manufacturer's site. This permits automated, robot-assisted initial filling at short cycle times, which is advantageous from an economic standpoint.

The main body is preferably formed as a single injection-molded part. It is provided that the side wall is equipped with a flange located opposite the bottom portion. This flange extends radially outwardly from the side wall.

The formation of the flange is advantageous for various reasons. Firstly, a stiffening of the main body is achieved, making it possible to configure it with thin walls. This saves weight and helps reduce manufacturing costs. In addition, the flange makes it possible to close the loading aperture by means of a cover, either by fusion-bonding or form fit. In the case of fusion-bonding, the supply container is designed as a disposable container, and in the case of a form-fittingly attached cover, it is designed as a reusable container.

The flange provided in accordance with the present invention provides a fusion-bonding surface extending on the upper face thereof. This allows the loading aperture provided by the main body to be closed by means of a film serving as a cover, the fusion-bonding surface provided by the flange allowing the film to be fusion-bonded to the flange in the fluid-tight manner. The film may at least partially be transparent or semi-transparent, thereby providing a viewing window for indicating the fill level.

Alternatively, the film may be replaced by a removable cover to be passed over the flange to engage therebehind, creating a form-fit. The flange provides an undercut for such engagement therebehind, the undercut allowing a cover placed on the flange to be securely and accurately fixed in position in a fluid-tight manner. This embodiment has the particular advantage that the supply container can be used several times. In order to refill the supply container, the user can remove the cover. Then, the supply container may be refilled with detergent, the supply container being subsequently closed by placing the cover thereon again.

The design of the present invention provides ease of handling, both for the manufacturer and the user. One and the same main body may optionally be used with a cover in the form of a film to be fusion-bonded to the main body or with a reusable cover which, during normal use, engages behind the undercut provided by the flange.

Another feature of the present invention provides that the flange surrounds the loading aperture provided by the main body and closable by the cover. Thus, the flange is flush with the loading aperture, which in particular facilitates mechanical filling with detergent and subsequent fusion-bonding of a film thereon, which serves as a cover.

The flange provides a fusion-bonding surface and/or an undercut in the manner described above. In this regard, the geometry of the flange is configured to allow fusion-bonding thereto of a film serving as a cover and/or form-fitting placement thereon of a removable cover in a proper manner.

In accordance with another feature of the present invention, the side wall of the main body has grasping recesses formed on the outer periphery thereof. These allow a user to easily insert the supply container into a dispensing device. The removal of a supply container from a dispensing device is also facilitated in this way.

In accordance with a further feature of the present invention, the side wall is provided on the outer side with supporting ribs having supporting surfaces. These supporting ribs constitute a type of placement geometry for showcasing purposes, making it possible to arrange the support container also in an upright position and/or in a raised position inclined to the vertical for purposes of sales promotion.

In order to permit introduction of detergent in metered amounts into the washing chamber of the cleaning appliance, the dispensing device as a metering unit. The metering unit may be configured in the dispensing device or in the supply container. Therefore, in accordance with a particular proposal of the present invention, it is proposed for the volumetric space to have a reservoir chamber and a metering chamber terminating in a dispensing opening, the metering chamber being fluidically connected to the reservoir chamber via an interposed passage opening, a closure being provided which closes the metering outlet opening at least until the supply container is first put into use.

In accordance with this preferred embodiment, the supply container has a metering unit which, inter alia, has a metering chamber provided by the supply container. To be able to effect metering of the detergent, the supply container has a reservoir chamber, on the one hand, and a metering chamber, on the other hand. The reservoir chamber is used for storing the detergent, and the metering chamber is used for dispensing the detergent in portions during operation. To this end, the metering chamber is divided into two fluidically connected sections, namely a metering space and a dispensing channel, which are separated by a barrier. The barrier bounds the metering space in such a manner that during a rotational movement of the supply container, first the metering space is filled with an amount of detergent determined by the size of the metering space. During further rotational movement, the amount of detergent introduced into the metering space is conveyed past the barrier into the dispensing channel and toward the dispensing opening without any additional detergent flowing from the reservoir chamber out into the metering space. Thus, during normal use, the detergent passes from the reservoir chamber through the passage opening into the metering space of the metering chamber, the size of the metering space determining the portioned amount of detergent. When the supply container is rotated further, the portioned amount of detergent exits the metering space and passes through the dispensing channel to the dispensing opening. During this process, no additional detergent can flow from the reservoir chamber through the passage opening into the metering space of the metering chamber due to the continued rotation of the supply container. In accordance with this embodiment, the outlet opening of the supply container is formed by the dispensing opening in which the dispensing channel terminates.

The present inventors have found that detergent stored in the supply container may clump due to unwanted ingress of moisture, even before first use. Clumping of detergent present in the metering chamber is particularly disadvantageous because this may cause clogging of the dispensing channel and/or blockage of the metering space, making it impossible to introduce metered amounts of detergent into the washing chamber of the cleaning appliance.

The present invention remedies this problem by providing a closure that closes the passage opening between the reservoir chamber and the metering chamber, at least until the supply container is first put into use. Thus, using the closure according to the present invention, it is ensured that the fluid connection between the reservoir chamber and the metering chamber is interrupted. Therefore, detergent stored in the supply container cannot flow over into the metering chamber. If unwanted ingress of moisture should occur, clumping of detergent may occur only in the reservoir chamber, but not in the metering chamber because the closure provided prevents passage of detergent from the reservoir chamber to the metering chamber. A possible clumping of detergent in the reservoir chamber is not as serious as a clumping in the metering chamber, as may occur in the prior art. This is because, on the one hand, any lumps which may form in the reservoir chamber are broken up during operational rotation of the supply container due to the size of the reservoir chamber and, on the other hand, the metering chamber is divided into a dispensing channel and a metering space, and, therefore, forms a type of labyrinth passage, which is more susceptible to formation of unwanted detergent deposits.

Moreover, since the fluid connection between the reservoir chamber and the metering chamber is interrupted until first use, it is ensured that the detergent can be properly portioned during first operation. Thus, the closure according to the present invention serves also as a storage and shipping closure because it effectively prevents detergent from migrating into the metering chamber prior to first use.

According to a first alternative of the present invention, the closure may have a closure element which is movably disposed on the supply container and is movable from a closed position closing the passage opening to an open position clearing the passage opening, and vice versa. This embodiment allows a user to open or close the passage opening as desired. Thus, advantageously, the passage opening can be opened and/or closed repeatedly, making it possible to remove the supply container form the metering unit before it is completely empty, and to close the passage opening thereof, so that the supply container can be reused and/or further used at a later time. Thus, this preferred embodiment of the present invention provides a reclosable passage opening.

The closure element may be a wall portion which in shape corresponds to the passage opening and is disposed on a rotatable disk. Accordingly, the closure element is rotatable and can be moved from an open position to a closed position by a user initiating a simple rotational movement. Preferably, the position of the closure element is visually indicated to a user by corresponding markings on the supply container and/or on the closure element, making it possible to ascertain from outside whether the passage opening between the reservoir chamber and the metering chamber is open or closed to fluid flow.

In an alternative embodiment of the present invention, the closure is a sealing film, which closes the passage opening until first use. Prior to first use of the supply container, the sealing film must be removed to clear the passage opening; i.e., to make the fluid connection between the reservoir chamber and the metering chamber barrier-free.

To this end, in accordance with another feature of the present invention, the sealing film may be disposed at one end of a tab whose other end extends through the dispensing opening. A user can grasp the tab and pull on it, causing the sealing film at the end of the tab to be torn open and/or torn off, thereby opening the passage opening.

In a further embodiment of the present invention, the metering chamber may be provided by a housing which is designed as a component separate from the supply container. The housing has a housing body which is replaceably received in the main body of the supply container. The housing providing the metering chamber can be removed by the user from the supply container as necessary. This design is advantageous especially in the case of reusable supply containers because it allows the user to clean the metering chamber, for example, using a bottle brush to be inserted through the dispensing opening into the housing providing the metering chamber.

In accordance with another feature of the present invention, the housing has a housing cover which is removably disposed on the housing body. The housing cover, when removed, provides direct access from above to the metering chamber, and thus to both the metering space and the dispensing channel, thereby making cleaning easier for the user. Thus, it is possible, in a first step of a cleaning operation, to separate the housing providing the metering chamber from the supply container and, in a second step, to disassemble the housing by removing the housing cover from the housing body, thereby providing unhindered access to the metering chamber. Any detergent residues, lumps and/or incrustations trapped or formed in the metering chamber can be removed without leaving any residue, thereby enabling reuse, which is also advantageous from an environmental point of view.

The housing body and the housing cover are preferably connectable together by snap-fit engagement. This provides ease of handling during removal of the housing cover, on the one hand, but on the other hand also ensures that the housing cover will not become unintentionally detached from the housing body, especially not when the housing is separated from the supply container during a replacement operation.

FIG. 21 shows, purely schematically, a cleaning appliance in the form of a dishwasher 100.

In a manner known per se, dishwasher 100 has a housing 101 that accommodates a washing tub 102. Washing tub 102, in turn, provides a treatment chamber, also called washing chamber 103, to receive items to be washed. To permit loading of washing chamber 103 with items to be washed, washing tub 102 has a loading opening 104. Loading opening 104 can be closed in a fluid-tight manner by a washing chamber door 1, which is supported so as to be pivotable about a horizontally extending pivot axis.

During normal use, wash liquid is applied to the items to be washed. To this end, dishwasher 100 is provided with a spray device 105. In the exemplary embodiment shown, spray device 105 includes an upper spray arm 106 and a lower spray arm 107.

FIG. 20 shows washing chamber door 1 in elevation, looking at the inner side thereof in the direction of view denoted A in FIG. 21.

As can be seen from FIG. 20, washing chamber door 1 is provided on the inner side with a combination device 3 which is generally known in the art and which has a rinse aid reservoir 4 as well as a supply container 5 that has to be filled manually with detergent by a user for each wash cycle.

In addition to the combination device 3 generally known in the art, dishwasher 100 further has a dispensing device 6 which, like combination device 3, is disposed on inner side 2 of washing chamber door 1. When washing chamber door 1 is closed, closing cover 7 of dispensing device 6 is in the closed position, as shown in FIG. 20.

As will be described in greater detail below, dispensing device 6 has a supply container 10 holding pourable detergent in powder form. During normal use, detergent is conveyed from supply container 10 into washing chamber 103 of dishwasher 100. To this end, a detergent outlet 8 is provided on inner side 2 of washing chamber door 1. This detergent outlet 8 is equipped with a cover or a pivoted cover 9.

FIGS. 1 through 19 show the supply container 10 configured in accordance with the present invention. FIGS. 1 through 5 relate to a first embodiment, FIGS. 6 through 10 relate to a second embodiment, FIGS. 11 and 12 relate to a third embodiment, and FIGS. 13 through 15 relate to a fourth embodiment. FIGS. 16 and 17 show the supply container (10) according to the first embodiment in a display position. FIGS. 18 and 19 show the supply container (10) according to the second embodiment, also in a display position.

The inventive supply container 10 has a main body 12 providing a volumetric space 11. Volumetric space 11 is of a size suitable for storing an amount of powdered detergent sufficient for performing a plurality of wash cycles.

Main body 12 has a bottom portion 14 and a side wall 15 integrally formed therewith. Bottom portion 14 provides a dome 13 which serves to receive an axle projection of a dispensing device 6 when supply container 10 is inserted in the dispensing device.

In accordance with the present invention, side wall 15 is equipped with a flange 16 located opposite bottom portion 14 and extending radially outwardly from side wall 15. Flange 16 surrounds the loading aperture 19 provided by main body 12 and closable by a cover 18.

Loading aperture 19 serves for filling supply container 10 with detergent. Such filling is performed by the manufacturer and/or by the user, depending on whether supply container 10 is used as a disposable container or as a reusable container. In any case, the size of loading aperture 19 allows for simple and easy-to-perform filling of supply container 10 with powdered detergent.

The flange 16 surrounding loading aperture 19 provides, on the one hand, a fusion-bonding surface 20 on the upper face thereof and, on the other hand, an undercut 21 because of the radial extent thereof. Due to this configuration, cover 18 can be embodied either as a film to be fusion-bonded to main body 12 or as a reusable cover which, during normal use, embraces undercut 21, creating a form-fit and sealingly closing loading aperture 19. In the case of a cover 18 in the form of a film fusion-bonded to main body 12, supply container 10 takes the form of a disposable supply container. In the case of a cover held by form-fit, the user can repeatedly use the cover for closing supply container 10, so that a reusable supply container is provided in this case.

To simplify the handling of supply container 10 for the user, the supply container is provided with grasping recesses 17.

To permit positionally accurate insertion of supply container 10 into a dispensing device 6, supply container 10 has locking projections 22 disposed on side wall 15. During normal use, these locking projections 22 engage in corresponding locking recesses of dispensing device 6, thereby ensuring that supply container 10 is fixed accurately in position relative to the receiving cavity of dispensing device 6.

Supply container 10 as outlet openings 23 for release of detergent. During a metering event, detergent stored in volumetric space 11 of supply container 10 is conveyed through these outlet openings 23 toward washing chamber 103.

In the embodiment shown, outlet openings 23 are closable. To this end, a rotary disk 24 is provided which has apertures 25 corresponding in shape to outlet openings 23. In the open position, outlet openings 23 and apertures 25 are in alignment, as shown in FIG. 3. However, when rotary disk 24 is in the closed position, outlet openings 23 are blocked by rotary disk 24, so that detergent removal is inhibited. The selective opening and/or closing of outlet openings 23 makes it possible to remove a not yet completely emptied supply container 10 from dispensing device 6 without the risk of detergent being unintentionally released from supply container 10.

In order to permit introduction of detergent in metered amounts into washing chamber 103, a metering unit is provided. This metering unit may be configured either in the dispensing device or in the supply container. The exemplary embodiment shown in FIGS. 1 through 5 illustrates a design where supply container 10 does not have a metering unit, and thus a design that cooperates with a dispensing device which itself provides a corresponding metering unit. Accordingly, in the embodiment shown in FIGS. 1 through 5, the entire volumetric space 11 provided by main body 12 serves as a reservoir chamber 26 for storing detergent.

The further FIGS. 6 through 15 show embodiments where supply container 10 provides a metering unit 27 integrally formed therewith. This metering unit 27 provides a metering chamber 28, so that the volumetric space 11 provided by main body 12 of supply container 10 is divided into a reservoir chamber 26 and a metering chamber 28, which are separated by a dividing wall 29.

The metering chamber 28 provided by a metering unit 27 is divided into two sections, namely a first section 30, called metering space, and a second section 31, called dispensing channel. As can be seen particularly in the views of FIGS. 7 and 8, dispensing channel 31 terminates in a dispensing opening 40, which at the same time constitutes outlet opening 23 of supply container 10.

Metering space 30 and dispensing channel 31 are in fluid connection with one another, the fluid connection being narrowed by a dispensing barrier 32, so that an overall labyrinth-like metering chamber 28 is formed.

Reservoir chamber 26 and metering chamber 28 are fluidically connected via a passage opening 33, through which detergent can flow from reservoir chamber 26 into metering chamber 28 during operation. A closure 34 is provided which closes passage opening 23 at least until supply container 10 is first put into use.

FIGS. 6 through 10 and 11 through 15 respectively show an embodiment where closure 34 is rotatably mounted in a holder integrated into dividing wall 29. In accordance with this embodiment, closure 34 has a rotatable disk 35 carrying a wall portion 36. Depending on the position of closure 34, passage opening 33 is either opened or blocked by wall portion 36. In order to enable the user to rotate closure 34, rotatable disk 35 is provided on its underside with a handle 42, as can be seen, for example, in FIGS. 9 and 10. Handle 42, in combination with lock symbols, also serves to indicate to a user whether closure 34 is in the open position (FIG. 9) or in the closed position (FIG. 10).

During normal use, supply container 10 is inserted in dispensing device 6, with closure 34 being in the open position. During operation, detergent is then metered and dispensed as follows: Supply container 10 is rotated 360 degrees about the axis of rotation defined by the axle projection received by dome 13 by means of a motor-powered drive of the dispensing device. In response to this rotation, detergent stored in reservoir chamber 26 is conveyed through passage opening 33 into metering chamber 28. However, due to dispensing barrier 32, only metering space 30 is filled, and thus metering chamber 28 is only partially filled. In any case, dispensing barrier 32 ensures that dispensing channel 31 initially remains free of detergent. The portioned amount of detergent is determined by the volume provided by metering space 30.

As the supply container is rotated further, passage opening 33 comes into a position in which passage opening 33 is located above the pouring level of the detergent stored in reservoir chamber 26, so that no more detergent flows from reservoir chamber 26 into metering space 30. When supply container 10 is in this rotational position, the detergent previously introduced into metering space 30 can flow past dispensing barrier 32 into dispensing channel 31. From there it passes through dispensing opening 40 into washing chamber 103.

Supply container 10 is configured with respect to its geometric shape, in particular with respect to passage opening 33 and dispensing barrier 32, in such a manner that, during a rotation of supply container 10, initially metering space 30 is filled with an amount of detergent determined by the size of metering space 30, and as the rotation continues, the amount of detergent introduced into metering space 30 is conveyed past dispensing barrier 32 into dispensing channel 31 and toward dispensing opening 40 without any additional detergent flowing from reservoir chamber 26 into metering space 30.

In an embodiment, such as is shown in FIGS. 1 through 5, a dispensing operation is performed in the same manner, the structural difference being that metering unit 27 is not an integral part of supply container 10, but a component of dispensing device 6.

Integration of metering unit 27 into supply container 10 has the advantage that when supply container 10 is disposed of, metering unit 27 is disposed of along with it. This minimizes the risk of detergent clumping, in particular in the metering unit, as a result of unwanted ingress of moisture. However, this embodiment has the disadvantage of a relatively complex configuration of the supply container, which increases the cost of manufacture. In this regard, the embodiment shown in FIGS. 1 through 5 is advantageous because the supply container of this embodiment is very simple of construction.

In the embodiment shown in FIGS. 6 through 10, a metering unit 27 is provided which has a housing 37 providing a housing body 38 and a housing cover 39. Housing cover 39 is removably disposed on housing body 38, which allows housing cover 39 to be removed as necessary, in particular to enable a user to clean housing body 38. Such a design presents itself for use in particular when supply container 10 takes the form of a reusable supply container, since in the case of reuse, there is an increasing risk of detergent lumps forming in metering chamber 28. This risk is addressed by allowing for cleaning by the user, for which reason housing cover 39 is designed to be removable.

In the embodiment shown in FIGS. 11 and 12, the dividing wall 29 separating reservoir chamber 26 from metering chamber 28 is configured to extend in the height direction to the height of flange 16 and, like flange 16, provides a fusion-bonding surface 20. In accordance with this embodiment, cover 18 is fusion-bonded to main body 12 and rests not only on flange 16, but also on dividing wall 29. This provides a secure connection between main body 12 and cover 18 and, in addition, ensures that the cover 18 in the form of a film will not sag. This design presents itself for use in particular in the case of a disposable supply container, since, due to the lack of a removable housing cover, metering chamber 28 is not cleanable by the user, or only to a limited extent through dispensing opening 40.

FIGS. 13 through 15 illustrate a further exemplary embodiment where, unlike in the embodiments shown in FIGS. 6 through 12, a differently designed closure 34 is used.

The closure 34 according to the embodiment shown in FIGS. 13 through 15 has a sealing film 43 disposed at the one end of a tab 44. At the other end, tab 44 is connected to a handle 45 that may be grasped by the user as necessary. As can be seen particularly from the illustration in FIG. 14, tab 44 extends outwardly through dispensing channel 31 and dispensing opening 40 when passage opening 33 is closed, so that the user can grasp the handle 45 disposed at the other end of tab 44.

On the metering chamber side, passage opening 33 has a slot formation 47 in which is inserted a carrier element 46. This carrier element 46 carries sealing film 43, which closes the passage opening until the supply container is first put into use.

In order to open passage opening 33, the user has to grasp tab 44 by handle 45 and then pull on tab 44, causing film 43 to detach from passage opening 33 so as to open the same.

For purposes of sales promotion, supply container 10 can be brought into a display position, such as is shown in FIGS. 16 through 19. In this display position, supply container 10 stands upright on a support 48, and is preferably inclined to the vertical. In the exemplary embodiment shown in FIGS.

1 through 5, in order to secure supply container 10 in this display position, a suitably configured grasping recess 17 is provided which provides suitable supporting surfaces 41. In the embodiment shown in FIGS. 18 through 19, grasping recesses 17 are geometrically oriented differently and, therefore, supporting ribs are provided for securing the supply container in the display position, the supporting ribs providing supporting surfaces 41. Arranging grasping recesses 17 in the manner shown, for example, in FIGS. 18 and 19 has turned out to be particularly ergonomic and, therefore, this embodiment is preferred.

Overall, due to the flange 16 disposed on side wall 15 of main body 12, supply container 10 provides a structural design that allows it to be used either as a disposable supply container equipped with a cover in the form of a film that is fusion-bonded thereon or as a reusable supply container equipped with a removable cover. Depending on the particular embodiment, supply container 10 is configured with an integrated metering unit 27 or without a metering unit, depending on the dispensing device 6 used, cooperates with supply container 10 during normal use.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 washing chamber
2 inner side
3 combination device
4 rinse aid reservoir
5 supply container
6 dispensing device
7 closing cover
8 detergent outlet
9 cover
10 supply container
11 volumetric space
12 main body
13 dome
14 bottom portion
15 side wall
16 flange
17 grasping recess
18 cover
19 loading aperture
20 fusion-bonding surface
21 undercut
22 locking projection
23 outlet opening
24 rotary disk
25 aperture
26 reservoir chamber
27 metering unit
28 metering chamber
29 dividing wall
30 first section (metering space)
31 second section (dispensing channel)
32 dispensing barrier
33 passage opening
34 closure
35 rotatable disk
36 wall portion
37 housing
38 housing body
39 housing cover
40 dispensing opening
41 supporting surface
42 handle
43 film
44 tab
45 handle
46 carrier element
47 slot formation
48 support
100 dishwasher
101 housing
102 washing tub
103 washing chamber
104 loading opening
105 spray device
106 spray arm
107 spray arm

What is claimed is:

1. A supply container for placement in a dispensing device of a program-controlled cleaning appliance, the supply container comprising:
    a main body providing a volumetric space, the volumetric space being of a size suitable for storing an amount of powdered detergent sufficient for performing a plurality of wash cycles, the main body including a bottom portion and a circumferential side wall integrally formed therewith, the side wall being equipped with a flange located opposite the bottom portion and extending radially outwardly from the side wall,
    wherein the volumetric space comprises a reservoir chamber and a metering chamber terminating in a dispensing opening, the metering chamber being fluidically connected to the reservoir chamber via an interposed passage opening.

2. The supply container as recited in claim 1,
    wherein the main body is open on one side so as to comprise a loading aperture, the loading aperture being configured to be closed by a cover, and
    wherein the flange surrounds the loading aperture.

3. The supply container as recited in claim 1, wherein the flange comprises a fusion-bonding surface.

4. The supply container as recited in claim 1, wherein the flange comprises an undercut.

5. The supply container as recited in claim 1, wherein the side wall comprises a grasping recess on an outer periphery thereof.

6. The supply container as recited in claim 1, wherein the side wall comprises supporting surfaces on an outer periphery thereof.

7. The supply container as recited in claim 1, further comprising a closure which closes the passage opening at least until the supply container is first put into use.

8. The supply container as recited in claim 7, wherein the closure has a closure element which is movably disposed on the supply container and is movable from a closed position to an open position and vice versa.

9. The supply container as recited in claim 7, wherein the closure comprises a sealing film.

10. The supply container as recited in claim 9, wherein the sealing film is disposed at a first end of a tab, a second end of the tab extending through the dispensing opening.

11. The supply container as recited in claim 7, wherein the metering chamber comprises a housing body that is disposed in the main body of the supply container.

12. The supply container as recited in claim 7, wherein a housing cover is removably disposed on the housing body.

13. The supply container as recited in claim 1, wherein the program-controlled cleaning appliance is a dishwasher.

14. The supply container as recited in claim 4, wherein the undercut is circumferential.

\* \* \* \* \*